United States Patent
Rhoads

(10) Patent No.: US 6,987,861 B2
(45) Date of Patent: Jan. 17, 2006

(54) SECURITY ARRANGEMENTS FOR PRINTED DOCUMENTS

(75) Inventor: Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 658 days.

(21) Appl. No.: 10/102,269

(22) Filed: Mar. 19, 2002

(65) Prior Publication Data

US 2003/0179210 A1    Sep. 25, 2003

(51) Int. Cl.
   *G06K 9/00*    (2006.01)

(52) U.S. Cl. ............... 382/100; 345/581; 345/582; 283/57; 283/113

(58) Field of Classification Search ........ 345/581–588; 715/500–542
   See application file for complete search history.

(56) References Cited

U.S. PATENT DOCUMENTS

| | | | |
|---|---|---|---|
| 6,036,232 A | 3/2000 | Kaule et al. | |
| 6,091,421 A * | 7/2000 | Terrasson | 345/419 |
| 6,369,919 B1 * | 4/2002 | Drinkwater et al. | 359/2 |
| 6,443,494 B1 | 9/2002 | Lieberman Zadjman et al. | |
| 6,608,911 B2 | 8/2003 | Lofgren et al. | |
| 6,753,989 B2 | 6/2004 | Holmes et al. | |
| 6,782,115 B2 | 8/2004 | Decker et al. | |
| 6,822,769 B1 | 11/2004 | Drinkwater et al. | |
| 2002/0117845 A1 | 8/2002 | Ahlers et al. | |
| 2003/0026613 A1 | 2/2003 | Holmes et al. | |

OTHER PUBLICATIONS

Steer, W.A., Stereograms: Introduction, Oct. 12, 2001, www.techmind.org/stereo/sintro.html, 3 pages.
Steer, W.A., Stereograms: Technical Details, Oct. 12, 2001, www.techmind.org/stereo/stech.html, 17 pages.

* cited by examiner

*Primary Examiner*—Jingge Wu
*Assistant Examiner*—A. Upreti
(74) *Attorney, Agent, or Firm*—Digimarc Corporation

(57) ABSTRACT

A security feature, by which a genuine document can readily be visually distinguished from a reproduction, employs finely detailed, laterally spaced structures to yield the illusion of a 3D texture. When replicated using commonly-available scanning or printing devices, the fine detail is lost, and with it the 3D illusion.

17 Claims, 4 Drawing Sheets

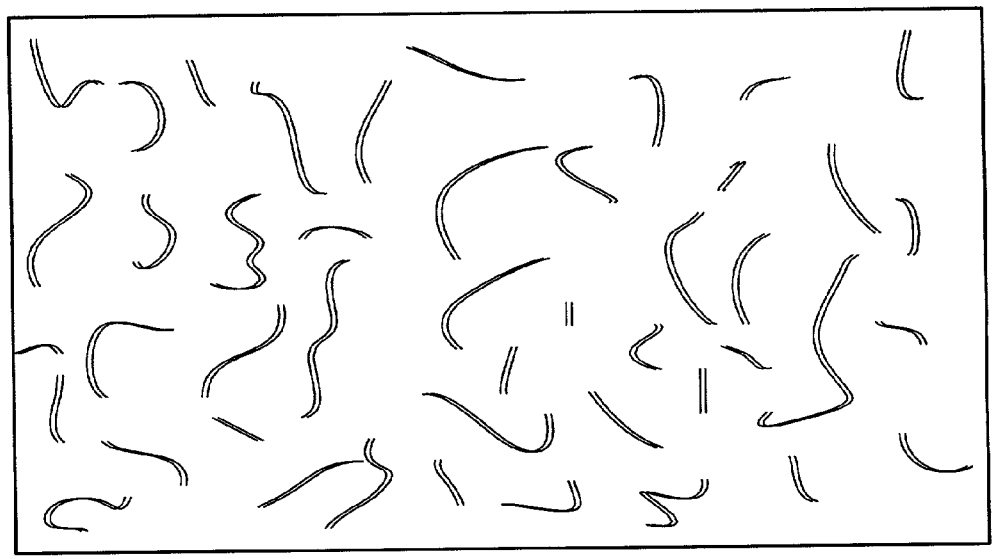
FIG. 2
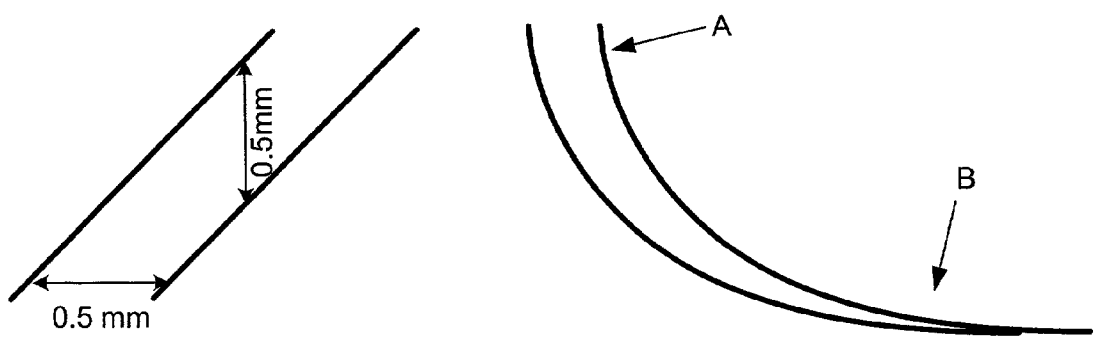
FIG. 2A   FIG. 2B

FIG. 3

SECURITY ARRANGEMENTS FOR PRINTED DOCUMENTS

FIELD OF THE INVENTION

The present invention relates to security arrangements for printed documents, and more particularly relates to a technique by which a document "copy" can readily be visually distinguished from an "original."

BACKGROUND AND SUMMARY OF THE INVENTION

It is well understood that high quality consumer scanners and color ink-jet printers have ushered in an age of unparalleled document counterfeiting. Nowhere is this threat more serious that in connection with counterfeiting of banknotes.

A number of techniques have been proposed to deal with this threat. Yet none has proved wholly successful.

Some techniques, for example, require use of forensic detection equipment to search for the presence of chemical or magnetic tracer elements to distinguish an original from a reproduction. Others require close inspection of a document to discern, e.g., a missing security thread.

In accordance with a preferred embodiment of the present invention, a printed document is provided with a feature that is readily discernable by casual visual inspection, yet is impractical to duplicate using commonly available scanning and printing technology. In one such embodiment, the feature is an optical illusion of a 3D surface on the planar document surface.

The foregoing and other features and advantages of the present invention will be more readily apparent from the following detailed description, which proceeds with reference to the accompanying drawings.

BRIEF DESCRIPTION OF THE DRAWINGS

FIG. 2 shows a limited number of laterally-spaced paired features, as may be used to create the illusion of texture on a banknote.

FIG. 2A shows a pair of horizontally spaced diagonal lines.

FIG. 2B shows a pair of horizontally space curved lines.

FIG. 3 shows a small excerpt from a banknote, with each pel represented as a separate box, showing the texture pattern ("T") and the normal banknote artwork ("N").

DETAILED DESCRIPTION

For expository convenience, the preferred embodiment is described with reference to a printed banknote. However, it should be recognized that the invention is not so limited, and can be used with all manner of printed documents, including passports and other photo identification documents, postal stamps, etc. Moreover, the same techniques can be applied to blank substrates to which printing may later be applied.

As is familiar, U.S. banknotes are printed on a cotton-based paper. Although the fibrous nature of the paper gives a banknote some surface texture, this texture is relatively minor. (Intaglio printing can also give a banknote some further texture, but this texture, too, is relatively minor.)

Outside of the United States, banknotes are sometimes printed on synthetic substrates. Again, these substrates are essentially devoid of marked texture.

In accordance with a preferred embodiment of the present invention, a banknote is printed with a pattern that creates an illusion of a 3D texture. Depending on the pattern selected, the banknote may appear to have a surface texture like that of felt, or a carpet. When touched by hand, however, a consumer finds the apparent texture to be an illusion.

The illusion is created by a viewer's stereoscopic vision. Lines or other visual features are printed in closely-laterally-spaced similar pairs. The spacing is slight enough that the viewer's vision naturally tends to focus slightly above or below the plane of the document, so as to bring the two similar features into apparent convergence. By using a multiplicity of such paired features (e.g., hundreds or thousands or more), the banknote can be given a highly textured (illusory) appearance.

The same principle is applied in certain art posters. Sometimes termed autostereograms, these posters have one appearance when the viewer focuses in the plane of the poster, and reveal a different image when the viewer deliberately defocuses—as if looking through the poster.

The present illusion does not require effort on the viewer's part. The feature pairs are so closely spaced that the brain reflexly interprets the patterning as texture.

Figure 1A:
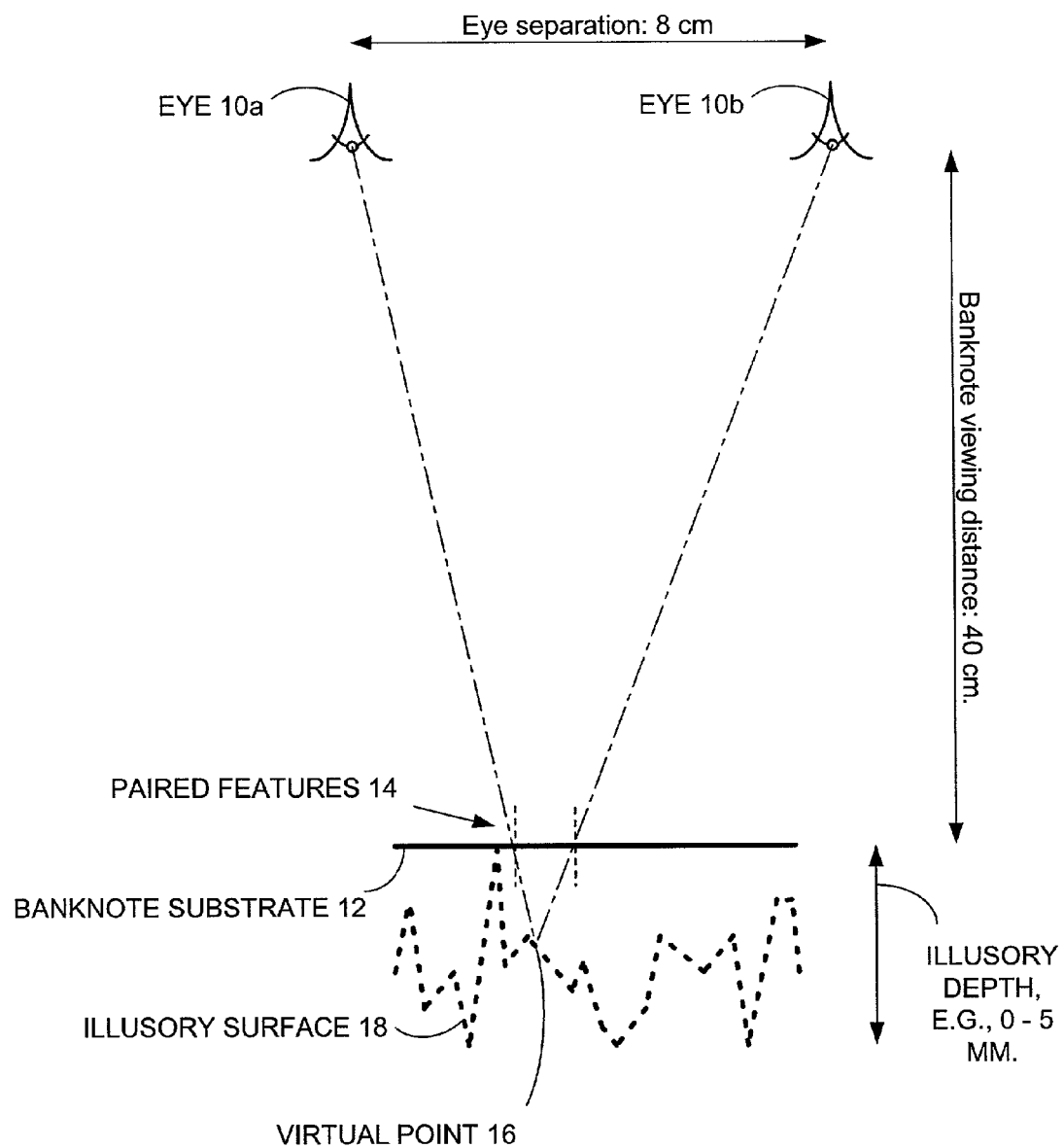
FIGS. 1A and 1B shows the optics of stereoscopic viewing, by which a closely spaced pair of features can give the illusion of 3D.

FIG. 1A shows the geometry of an illustrative arrangement (not to scale). A pair of viewer eyes $10a$, $10b$, looks at a banknote substrate 12 from a viewing distance of about 40 cm. The eyes are spaced approximately 8 cm apart. Printed on the substrate 12 are a pair of similar features 14 (shown in vertical dashed lines for illustrative convenience). The similarly of the features (e.g., both of roughly the same size and shape) causes the human visual system to want to bring them into alignment, making the brain perceive a virtual feature on the apparent surface at location 16 beyond the substrate. The effect of hundreds or thousands of such paired features is to create the illusion of a textured surface 18.

Figure 1B:
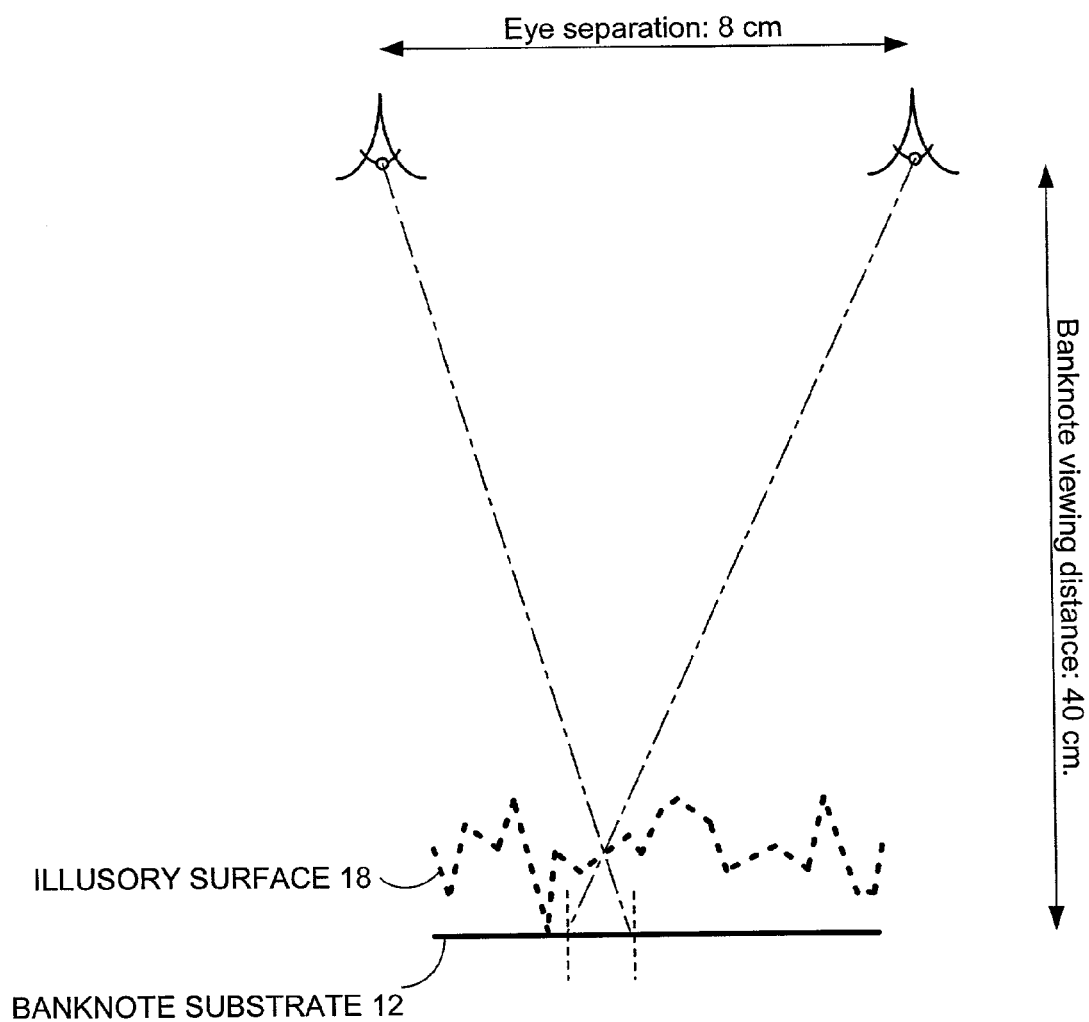

It will be recognized that the brain can interpret this illusion either as a feature extending down from, or up from, the nominal banknote surface. FIG. 1B shows the latter geometry (an inverted version of the FIG. 1A illusory surface). The choice is the brain's, although deliberate action by the viewer may switch the interpretation.

The apparent depth of the illusory texturing is, of course, dependent on the spacings of the feature pairs 14. The illustrated arrangement produces an illusion that varies through a depth of 4 millimeters. The smaller the apparent depth, the easier it is to fool the brain into seeing the illusion. But the magnitude of the illusion, and its anti-counterfeiting value, is reduced accordingly.

In the arrangements shown in FIGS. 1A and 1B, the illusory surface 16 appears coincident at some points with the actual banknote surface, or nearly so. This is helpful in allowing the eyes to seamlessly perceive the illusion of texture, without having to make a discontinuous jump in focal depth (from the plane of the banknote to the nearest feature on the virtual surface).

It will be recognized that making the illusory surface 16 coincident with the actual substrate 12 means that the spacing between the paired features is zero. While at this limiting case the two features merge into one, feature spacings on the order of a ten-thousandth of an inch are realizable with some banknote printing technologies. Features spaced at this close distance can create an illusory feature at a point less than a thousandth of an inch below (or above) the substrate. (The ratio of the apparent illusory surface depth to the feature pair spacing is equal to the ratio of the viewing distance to the eye spacing.)

FIG. 2 shows a small collection of features printed in laterally-paced pairs. Unlike the preferred embodiment, all of the lateral spacings are identical in this example. And the spacings are larger than would typically be used. And the features are much larger than would typically be used (in an exemplary arrangement, features having maximal dimensions between 0.5 to 10 thousandths of an inch may be used). And the line weights/thicknesses are uniform and identical (this not being necessary). And, obviously, the number of features does not begin to approach the number that would be required to give an illusion of texture. But even this elementary depiction gives the viewer a sense for the work the brain and eyes will automatically undertake to try and make sense out of the laterally-spaced features.

Although the features in FIG. 2 are curved, in other embodiments this need not be the case. The features can comprise straight lines (of the same or different lengths, weights and colors), in closely-laterally-spaced pairs. The lines can all be oriented vertically, or they can be inclined, or at different angular orientations.

The reason the texturing is not susceptible to counterfeiting is because the features are desirably sized and/or spaced too close for commercially-available printing and scanning technologies to replicate. Banknote printing is performed at a resolution on the order of four thousand to ten thousand picture elements (pels) per inch. The component features comprising the texture pattern may be just one or or few pels in thickness. When scanned using a scanner having a resolution of, e.g., 1200 dots per inch, a feature that is just a ten-thousandth of an inch across is essentially lost: if it is sensed at all, it is not sensed to the degree required for faithful reproduction. Moreover, ink jet printing technology further corrupts the fidelity of reproduction. Again, printer resolution of 1200 dots per inch serves more to destroy, rather than duplicate, the component features.

It will be recognized that the "lateral" spacing of the features corresponds to the eyes' lateral spacing. If a substrate with laterally-spaced features is rotated 90 degrees, so that the feature separation is vertical, then the illusion tends to disappear (i.e., the horizontal spacing of the viewer's eyes requires the paired features to be horizontally spaced in order to create the illusion).

FIG. 2 is not a striking example of this effect because of the random curvatures and orientations of the features—geometries that often result in apparent vertical, as well as horizontal, feature spacings. To illustrate, consider the pair of 45 degree diagonal lines shown in FIG. 2A. These lines are spaced apart horizontally 0.5 mm, but also appear to be spaced apart vertically by the same amount. Likewise, consider the pair of curved lines shown in FIG. 2B. These lines appear to have varying spacing—both in the horizontal and vertical directions. (This appearance is itself illusional; FIG. 2B comprises two identical features spaced apart a fixed horizontal distance.)

In order for the illusion to totally disappear when the banknote is rotated 90 degrees, the features would have to comprise lateral pairings of vertical lines. It is not practical to create the illusion of a marked 3D fibrous texture using just vertical lines. However, the texture pattern can be synthesized so that the illusion otherwise shifts in a distinctive manner as the banknote is rotated. Features, or portions thereof, that appear horizontally spaced-apart, contribute to an illusion when the banknote is viewed at one orientation, but do not so contribute when the banknote is rotated. Conversely, features or portions that appear vertically spaced-apart, normally do not contribute to an illusion, but do so when the banknote is rotated. Thus, patterns can be synthesized that create different 3D illusions when viewed at different orientations—again providing a conspicuous visual feature that the public can come to associate with legitimate banknotes.

As resolution of commonly-available scanners and printers increase, the texture patterns may be amended accordingly to ensure corruption of the 3D illusion by the latest equipment. Thus, in the context of banknote printing, it may be desirable to generate new banknote texture patterns every 3 years or so, so as to assure maximal conspicuousness of the texture, while optimizing its destruction by scanning/printing with then-current technologies.

Figure 3:
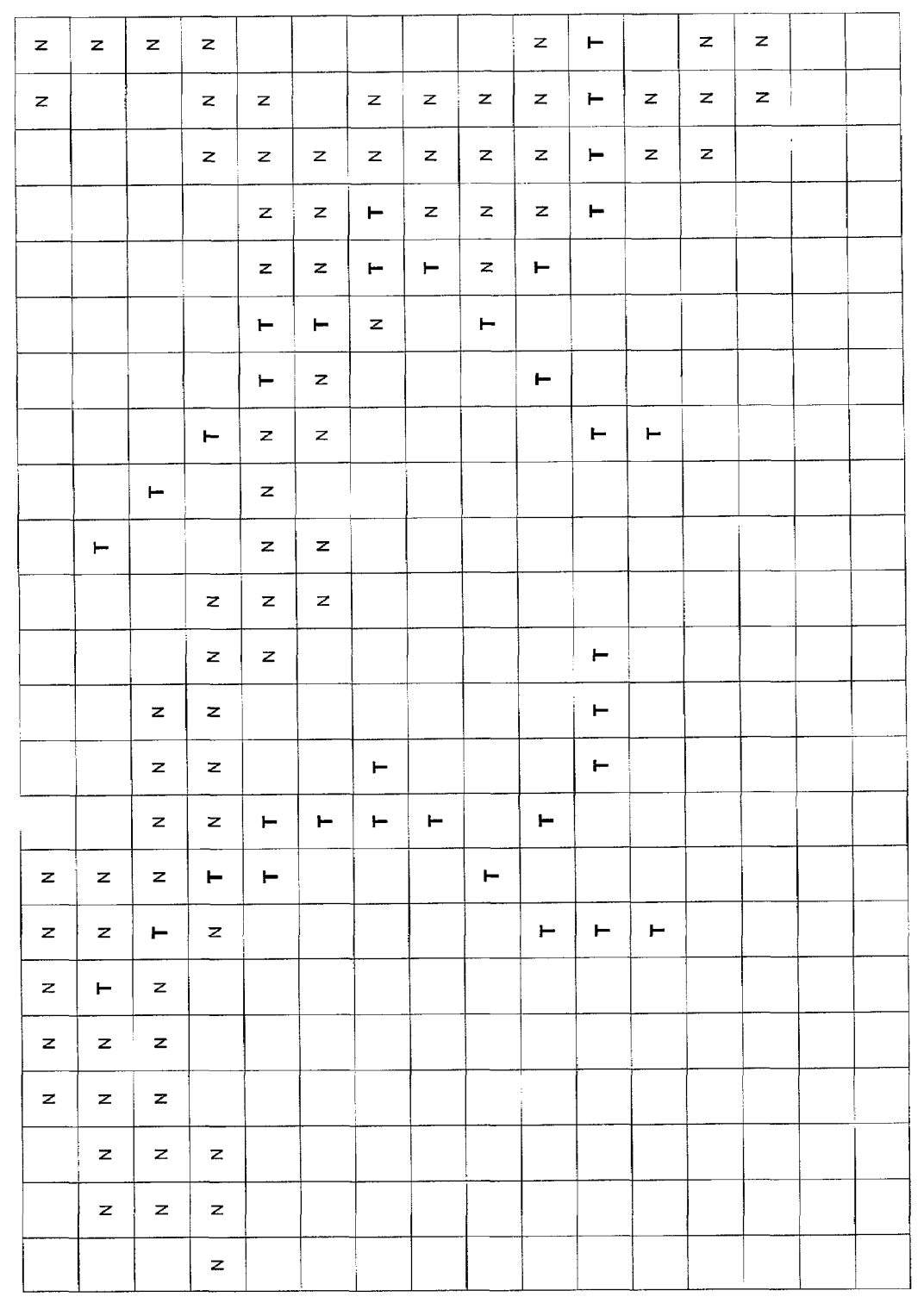

FIG. 3 shows a small excerpt from a banknote, with each pel represented as a separate box. Some of the pels, labeled "T," are pels printed to form the texture pattern. Others, labeled "N," are printed to form other artwork on the banknote. The remaining pels may be blank (unprinted). (The "T" pels in FIG. 3 are printed in a larger font to aid in distinguishing the different pels.)

It will be seen that the "T's in FIG. 3 form two laterally-spaced figures. Unlike the lines used in FIG. 2, the texture figures printed in FIG. 3 have some branching structures. Moreover, the pair of laterally-spaced features are not exactly identically shaped, as this is not essential to create the illusion of texture. (Note, however, that shading can be a component of the synthesized 3D illusion, without it being a part of the individual "T" structures.)

Just as the traditional artwork on a banknote need not be monochromatic, neither do the texture structures need to be of a uniform color.

While the depicted arrangements do not employ shading in the texture structure, this may be found to be advantageous. However, since shading tends to increase the thickness of the structures, it has been omitted in the examples given above.

A process for generating the texture pattern may proceed as follows. First, a model of the desired texture is generated (e.g., a wire frame model). Second, from this model, the necessary separations of the feature pairs, as a function of location across the 2D substrate, are determined—yielding a "separation map." One or myriad features (e.g., the "T" structure on the left side of FIG. 3) are then defined—without pairing. Next, features are paired in spacings determined by the separation map, to yield a texture pattern. Once the texture pattern is formed, it can be overlaid on the remaining banknote artwork pattern—either summed with the artwork pel values (e.g., luminance and chrominance), or replacing such pels altogether.

Although the pels comprising the texture pels are distinguished from those comprising the rest of the banknote image, it will be recognized that some of the features comprising the banknote image can, themselves, be paired with similar structures to contribute to the texture effect. The pels forming the texture structure can also form part of the traditional banknote artwork.

In like fashion, the pels comprising the texture pattern can form, or contribute to, a steganographic digital watermark pattern, e.g., of the sort disclosed in U.S. Pat. No. 6,345,104 and in copending application Ser. No. 09/503,881 (now U.S. Pat. No. 6,614,914) and Ser. No. 09/553,112 (now abandoned, but the disclosure of which was included in published patent application 20030215112).

To provide a comprehensive disclosure without unduly lengthening this specification, applicant incorporates by reference the patents and patent applications cited above (except the portion of publication 20030215112 that was not disclosed in application Ser. No. 09/553,112).

Having described and illustrated the principles of my invention with reference to an exemplary embodiment, it will be recognized that the embodiment can be varied in arrangement and detail without departing from such principles. Accordingly, I claim as my invention all such modifications as may fall within the scope and spirit of the following claims, and equivalents thereto.

I claim:

1. A method for generating 2D banknote artwork, comprising:

generating a first set of data specifying a desired 3D texture topology;

from the first set of data, generating a second set of data specifying lateral feature spacing as a function of 2D location;

providing one or more feature shapes;

forming a texture pattern comprised of pairings of said feature shapes, the pairing distances being set as a function of location in accordance with the second set of data; and combining the texture pattern with traditional banknote artwork.

2. The method of claim 1 wherein the desired 3D texture topology defines a surface texture like that of felt.

3. The method of claim 1 wherein the desired 3D texture topology defines a surface texture like that of carpet.

4. The method of claim 1 wherein the desired 3D texture topology comprises a surface that appears, in some locations, to be above the plane of a substrate on which the artwork is to be printed.

5. The method of claim 4 wherein the desired 3D texture topology comprises a surface that appears, in some locations, to be below the plane of a substrate on which the artwork is to be printed.

6. The method of claim 1 wherein the desired 3D texture topology comprises a surface that appears, in some locations, to be below the plane of a substrate on which the artwork is to be printed.

7. The method of claim 1 wherein said feature shapes have maximal dimensions less than 10 thousandths of an inch.

8. The method of claim 1 wherein said feature shapes have maximal dimensions of between 0.5 and 10 thousandths of an inch.

9. The method of claim 1 wherein said features comprise lines.

10. The method of claim 1 wherein said features comprise branching structures.

11. The method of claim 1 wherein certain of said paired feature shapes are spaced a distance apart horizontally, and certain of said paired feature shapes are spaced a distance apart vertically.

12. The method of claim 1 wherein an illusion of texture associated with viewing of said texture pattern shifts if the artwork is rotated.

13. The method of claim 1 wherein said texture pattern yields a first illusion of non-flat texture if the artwork is viewed at a first orientation, and yields a second, different, illusion of non-flat texture if the artwork is viewed at a second, different, orientation.

14. The method of claim 1 wherein the features are sized and/or spaced too close for commercially-available printing and scanning technologies to replicate.

15. The method of claim 1 wherein the features are sized and/or spaced too close for faithful reproduction using a 1200 dpi scanner.

16. The method of claim 1 that further includes printing a banknote, using said generated banknote artwork.

17. A banknote produced by the method of claim 16.

* * * * *